(12) United States Patent
Zhang

(10) Patent No.: US 12,219,298 B2
(45) Date of Patent: Feb. 4, 2025

(54) GAMUT MAPPING METHOD AND SYSTEM

(71) Applicant: SHENZHEN TCL NEW TECHNOLOGY CO., LTD., Guangdong (CN)

(72) Inventor: Xiaodong Zhang, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 429 days.

(21) Appl. No.: 17/753,460

(22) PCT Filed: Sep. 2, 2020

(86) PCT No.: PCT/CN2020/113021
§ 371 (c)(1),
(2) Date: Mar. 3, 2022

(87) PCT Pub. No.: WO2021/043164
PCT Pub. Date: Mar. 11, 2021

(65) Prior Publication Data
US 2022/0345675 A1    Oct. 27, 2022

(30) Foreign Application Priority Data

Sep. 3, 2019  (CN) .......................... 201910828423.5

(51) Int. Cl.
*H04N 9/67* (2023.01)
*G09G 5/06* (2006.01)
*G09G 5/10* (2006.01)

(52) U.S. Cl.
CPC ................ *H04N 9/67* (2013.01); *G09G 5/06* (2013.01); *G09G 5/10* (2013.01);
(Continued)

(58) Field of Classification Search
None
See application file for complete search history.

(56) References Cited

U.S. PATENT DOCUMENTS

2002/0085750 A1   7/2002  Hoshuyama
2015/0015597 A1*  1/2015  Sano ................... H04N 1/6058
                                                345/590
(Continued)

FOREIGN PATENT DOCUMENTS

CN    101123080 A    2/2008
CN    101253762 A    8/2008
(Continued)

OTHER PUBLICATIONS

International Search Report in International application No. PCT/CN2020/113021, mailed on Dec. 3, 2020.

*Primary Examiner* — Andrew G Yang
(74) *Attorney, Agent, or Firm* — PV IP PC; Wei Te Chung

(57) ABSTRACT

The present disclosure provides a gamut mapping method and a system. The method includes: obtaining a brightness value of each sampling point corresponding to image data of a transmission end on a basis of a three-dimensional mapping table; performing equal-brightness cutting on a three-dimensional gamut model of the transmission end and a three-dimensional gamut model of a display end separately on a basis of the brightness value of each sampling point to form a corresponding equal-brightness two-dimensional surface; and performing color mapping on a basis of the formed equal-brightness two-dimensional surface and outputting mapping data. Hence, during gamut mapping, brightness and tone are kept unchanged, precise matching of three-dimensional gamut mapping from a transmission gamut to a display gamut is realized, avoiding problems of image distortion or a display error or the like due to mapping mismatch between the transmission gamut and the display gamut.

11 Claims, 5 Drawing Sheets

(52) U.S. Cl.
　　CPC . *G09G 2320/0626* (2013.01); *G09G 2340/06* (2013.01); *G09G 2360/16* (2013.01)

(56) References Cited

U.S. PATENT DOCUMENTS

| | | | | |
|---|---|---|---|---|
| 2015/0221281 A1* | 8/2015 | Bosco | .................... | G09G 5/026 345/590 |
| 2017/0345390 A1* | 11/2017 | Orio | ........................ | G09G 5/06 |
| 2019/0158894 A1* | 5/2019 | Lee | ........................ | H04N 19/46 |
| 2019/0279598 A1* | 9/2019 | Mito | ........................ | G09G 5/02 |

FOREIGN PATENT DOCUMENTS

| | | | | | |
|---|---|---|---|---|---|
| CN | 101583040 | A | | 11/2009 | |
| CN | 101646010 | A | | 2/2010 | |
| CN | 101754030 | A | | 6/2010 | |
| CN | 101790100 | A | | 7/2010 | |
| CN | 201608833 | U | | 10/2010 | |
| CN | 102598114 | A | | 7/2012 | |
| CN | 102625111 | | * | 8/2012 | .............. H04N 9/64 |
| CN | 102625111 | A | | 8/2012 | |
| CN | 103093412 | A | | 5/2013 | |
| CN | 104702815 | A | | 6/2015 | |
| CN | 109286802 | A | | 1/2019 | |
| EP | 0961488 | A2 | | 12/1999 | |
| EP | 3301902 | A1 | | 4/2018 | |

* cited by examiner

GAMUT MAPPING METHOD AND SYSTEM

BACKGROUND OF THE INVENTION

Priority

This disclosure claims the priority to a Chinese patent application with an application date of Sep. 3, 2019 and an application number of "201910828423.5" and an application title of "A Gamut Mapping Method and System", the entire contents of which are by reference incorporated in its entirety in this disclosure.

Field of the Invention

The present disclosure relates to the technical field of image processing, and in particular, to a gamut mapping method and a system.

Description of the Prior Art

Radio and television receivers often encounter a problem of inconsistency between transmission gamut (gamut transmitted by the radio and television system, the source gamut) and display gamut (gamut that a display can cover) when performing color restoration. This problem will cause the reproduced color to be unable to be truly restored, and even a problem of color distortion will occur.

At present, the transmission gamut of the radio and television system includes BT601 (standard definition), BT709 (high definition), and so on. With the development of display technology, range of display gamut continues to expand. At present, the display gamut (LCD liquid crystal display device) is usually larger than the transmission gamut (BT601, BT709). Moreover, the display gamut usually cannot completely cover the transmission gamut, and the two have parts that do not overlap with each other.

How to present color of the transmission gamut on the display without distortion and make use of the ability of the display gamut as much as possible, here it involves a problem of expansion or mapping from the transmission gamut to the display gamut.

In view of the above problem, one current practice is to realize the mapping from the transmission gamut to the display gamut through a 3×3 matrix. It is not very accurate to use the 3×3 matrix to achieve the mapping matching from the transmission gamut to the display gamut. It is only roughly matched, and distortion and errors will occur.

Gamut extension or mapping disclosed in the prior art is often designed based on the (x, y) two-dimensional surface of CIE1931, as shown in FIG. 1, which is a schematic view of the two-dimensional transmission gamut and the two-dimensional display gamut, respectively. An area enclosed by a slightly smaller triangle is the transmission gamut (BT709) to be transmitted by the broadcast television system, and an area enclosed by the slightly larger triangle is the display gamut of a terminal broadcast TV. The display gamut is larger than the transmission gamut (BT709), but in reality, real gamut is three-dimensional, reflecting three dimensions of brightness, tone, and hue, not just the (x, y) two-dimensional surface.

Hence, the existing technology is defective, and it is urgent to improve it.

BRIEF SUMMARY OF THE INVENTION

In view of above-mentioned deficiencies in the prior art, the present disclosure provides a gamut mapping method and a system to solve at least one of above-mentioned technical problems.

According to an embodiment of the present disclosure, a gamut mapping method is disclosed. In a first aspect, the gamut mapping method includes: obtaining a brightness value of each of sampling points corresponding to image data of a transmission end on a basis of a three-dimensional mapping table; performing equal-brightness cutting on a three-dimensional gamut model of the transmission end and a three-dimensional gamut model of a display end separately on a basis of the brightness values of the sampling points, and forming corresponding equal-brightness two-dimensional surfaces; and performing color mapping on a basis of the equal-brightness two-dimensional surfaces, and outputting mapping data.

According to an embodiment of the present disclosure, before the step of obtaining the brightness values of the sampling points corresponding to the image data of the transmission end on the basis of the three-dimensional mapping table, the gamut mapping method further includes a step of: building the three-dimensional gamut model of the transmission end and the three-dimensional gamut model of the display end separately.

According to an embodiment of the present disclosure, the step of building the three-dimensional gamut model of the transmission end includes: performing a linearization processing on the image data obtained, and obtaining linear RGB coordinates of each of pixel points in the image data after the linearization processing; determining a plurality of three-dimensional gamut coordinates converted from the linear RGB coordinates to an XYZ color model using preset matrix parameters and the linear RGB coordinates of each of the pixel points; determining a plurality of three-dimensional gamut coordinates converted from the linear RGB coordinates to a Yxy color model according to the three-dimensional gamut coordinates converted to the XYZ color model; and building the three-dimensional gamut model of the transmission end according to the three-dimensional gamut coordinate converted to the Yxy color model.

According to an embodiment of the present disclosure, the step of performing the linearization processing on the obtained image data includes: converting a value range of the obtained image data from $0-(2^n-1)$ to 0-1.

According to an embodiment of the present disclosure, the step of building the three-dimensional gamut model of the display end includes: obtaining display image data corresponding to display setting parameters on a display, normalizing the display image data, and obtaining linear RGB coordinates of each of pixel points in the display image data after a linearization processing; determining a plurality of three-dimensional gamut coordinates converted from the linear RGB coordinates of each of the pixel points in the display image data to an XYZ color model according to a plurality of pre-stored display parameter matrices and the linear RGB coordinates of each of the pixel points in the display image data; determining a plurality of three-dimensional gamut coordinates converted from the linear RGB coordinates of each of the pixel points in the display image data to a Yxy color model according to the three-dimensional gamut coordinates converted to the XYZ color model; and building the three-dimensional gamut model of a display gamut of the display end according to the three-dimensional gamut coordinates converted to the Yxy color model.

According to an embodiment of the present disclosure, the step of performing equal-brightness cutting on the three-dimensional gamut model of the transmission end and the three-dimensional gamut model of the display end separately on the basis of the brightness values of the sampling points, and forming the corresponding equal-brightness two-dimensional surfaces includes: calculating transmission three-dimensional gamut coordinates of each sampling point in the three-dimensional gamut model of the transmission end on a basis of pixel point values of each sampling point; and performing equal-brightness cutting on the three-dimensional gamut model of the transmission end and the three-dimensional gamut model of the display end separately according to brightness values contained in the transmission three-dimensional gamut coordinates, and obtaining a series of equal-brightness two-dimensional surfaces.

According to an embodiment of the present disclosure, the step of calculating transmission three-dimensional gamut coordinates of each sampling point in the three-dimensional gamut model of the transmission end on the basis of pixel point values of each sampling point includes: performing a linearization processing on each sampling point, and obtaining linear RGB coordinates of each sampling point after the linearization processing; determining three-dimensional gamut coordinates converted from the linear RGB coordinates of each sampling point to an XYZ color model according to preset matrix parameters and the linear RGB coordinates of each sampling point; and determining transmission three-dimensional gamut coordinates converted from the linear RGB coordinates of each sampling point to a Yxy color model according to the three-dimensional gamut coordinate converted to the XYZ color model.

According to an embodiment of the present disclosure, the step of performing color mapping on the basis of the equal-brightness two-dimensional surfaces, and outputting the mapping data includes: building a mapping relationship between RGB coordinates of each sampling point on an equal-brightness two-dimensional surface of the transmission end and RGB coordinates of each sampling point on an equal-brightness two-dimensional surface of the display end on a basis of equal-brightness values; and mapping the RGB coordinates of each sampling point of the transmission end to the equal-brightness two-dimensional surface of the display end according to the mapping relationship.

According to an embodiment of the present disclosure, the step of building the mapping relationship between RGB coordinates of each sampling point on an equal-brightness two-dimensional surface of the transmission end and RGB coordinates of each sampling point on the equal-brightness two-dimensional surface of the display end on the basis of equal-brightness values includes: obtaining a two-dimensional gamut surface of a transmission gamut of equal-brightness and a two-dimensional surface of a display gamut of equal-brightness; and building a mapping relationship between the RGB coordinates of each sampling point on the equal-brightness two-dimensional surface of the transmission end and the RGB coordinates of each sampling point on the equal-brightness two-dimensional surface of the display end according to pre-stored RGB coordinates of white points corresponding to the transmission end, RGB coordinates of white points corresponding to the display end, linear RGB coordinates of each sampling point on the equal-brightness two-dimensional surface, coordinates of intersection of a connecting line composed of the white point and each sampling point with the equal-brightness two-dimensional surface of the transmission end, and coordinates of intersection of the connecting line with the equal-brightness two-dimensional surface of the display end.

According to an embodiment of the present disclosure, a relational expression of the mapping relationship between the RGB coordinates of each sampling point on the equal-brightness two-dimensional surface of the transmission end and the RGB coordinates of each sampling point on the equal-brightness two-dimensional surface of the display end is:

$$WA_i/WE = WA_O/WF$$

$$X_{AO} = (x_{Ai} - x_w) * (x_F - x_w)/(x_E - x_w)$$

$$y_{AO} = (y_{Ai} - y_w) * (y_F - y_w)/(y_E - y_w)$$

wherein $W(x_w, y_w)$ is the pre-stored RGB coordinate of the white points corresponding to the transmission end, $A_i(x_{Ai}, y_{Ai})$ is a linear RGB coordinate of given sampling point, $E(x_E, y_E)$ is a coordinate of intersection of a connecting line composed of $W(x_w, y_w)$ and $A_i(x_{Ai}, y_{Ai})$ with the equal-brightness two-dimensional surface of the transmission end, $F(x_F, y_F)$ is a coordinate of intersection of the connecting line with the equal-brightness two-dimensional surface of the display end, $WA_i$ is a straight line composed of two points $W(x_w, y_w)$ and $A_i(x_{Ai}, y_{Ai})$, WE is a straight line composed of two points $W(x_w, y_w)$ and $E(x_E, y_E)$, $WA_O$ is a straight line composed of two points $W(x_w, y_w)$ and $A_O(x_{AO}, y_{AO})$, and WF is a straight line composed of two points $W(x_w, y_w)$ and $F(x_F, y_F)$.

According to an embodiment of the present disclosure, the step of mapping the RGB coordinates of each sampling point of the transmission end to the equal-brightness two-dimensional surface of the display end according to the mapping relationship includes: calculating linear RGB coordinates of each sampling point on the equal-brightness two-dimensional surface of the transmission end mapping to linear RGB coordinates on the equal-brightness two-dimensional surface of the display end according to the pre-stored RGB coordinates of the white points corresponding to the transmission end, the RGB coordinates of the white points corresponding to the display end, the linear RGB coordinates of each sampling point on the equal-brightness two-dimensional surface, the coordinates of intersection of the connecting line composed of the white point and each sampling point with the equal-brightness two-dimensional surface of the transmission end, and the coordinates of intersection of the connecting line with the equal-brightness two-dimensional surface of the display end, and the relational expression of the mapping relationship; and combining the linear RGB coordinates of each sampling point on the equal-brightness two-dimensional surface of the display end with the brightness values, converting the combined linear RGB coordinates and the brightness values into the mapping data, and outputting and displaying the mapping data.

According to an embodiment of the present disclosure, the step of combining the linear RGB coordinates of each sampling point on the equal-brightness two-dimensional surface of the display end with the brightness values, converting the combined linear RGB coordinates and the brightness values into the mapping data, and outputting and displaying the mapping data includes: obtaining values of a three-dimensional RGB of a target gamut according to a combination of values of a two-dimensional pixel of the target gamut and its brightness values; converting the values of the three-dimensional RGB of the target gamut to three-dimensional gamut coordinates of an XYZ color model from three-dimensional gamut coordinates of a Yxy color model according to a conversion formula between RGB values of the XYZ color model and RGB values of the Yxy color model; and calculating outputting image data according to the three-dimensional gamut coordinates of the target gamut converted to the XYZ color model and preset display parameter matrices of a display.

According to an embodiment of the present disclosure, the step of combining the linear RGB coordinates of each sampling point on the equal-brightness two-dimensional surface of the display end with the brightness values, converting the combined linear RGB coordinates and the brightness values into the mapping data, and outputting and displaying the mapping data includes: filling the mapping data with a linear interpolation, and outputting and displaying the filled mapping data.

According to an embodiment of the present disclosure, before the step of obtaining the brightness values of each sampling point corresponding to the image data of the transmission end on the basis of the three-dimensional mapping table, the gamut mapping method further includes steps of: calculating pre-matrix parameters according to two-dimensional coordinates of an RGB vertex gamut of a signal source end and two-dimensional coordinates of white points of the signal source end; and calculating preset display parameter matrices according to two-dimensional coordinates of an RGB vertex gamut of the display end and two-dimensional coordinates of white points of the display end.

According to an embodiment of the present disclosure, a gamut mapping system is disclosed. In another aspect, the gamut mapping system includes: a brightness-value obtaining module being configured to obtain a brightness value of each sampling point corresponding to image data of a transmission end on a basis of a three-dimensional mapping table; an equal-brightness cutting module being configured to perform equal-brightness cutting on a three-dimensional gamut model of the transmission end and a three-dimensional gamut model of a display end separately on a basis of the brightness values of each sampling point, and form corresponding equal-brightness two-dimensional surfaces; and an outputting-data conversion module being configured to perform color mapping on a basis of the equal-brightness two-dimensional surfaces, and output mapping data.

An embodiment of this disclosure achieves an advantageous effect that according to the method provided by the embodiment of the present disclosure, a brightness value of each of sampling points corresponding to an image data of a transmission end is obtained on the basis of a three-dimensional mapping table. Perform equal-brightness cutting on a three-dimensional gamut model of the transmission end and a three-dimensional gamut model of a display end separately on the basis of the brightness value of each of the sampling points, and form a corresponding equal-brightness two-dimensional surface. Perform color mapping on the basis of the equal-brightness two-dimensional surface, and output a mapping data. During gamut mapping, the brightness and tone are kept unchanged, precise matching of three-dimensional gamut mapping from a transmission gamut to a display gamut is implemented, thereby avoiding the problems of image distortion or a display error or the like due to mapping mismatch between the transmission gamut and the display gamut.

BRIEF DESCRIPTION OF THE DRAWINGS

For more clearly understanding above content of the present disclosure, the following text will briefly introduce the accompanying drawings used in the preferred embodiment of the present invention. It is obvious that the accompanying drawings in the following description are only some embodiments of the present invention. For the technical personnel of the field, other drawings can also be obtained from these drawings without paying creative work.

DETAILED DESCRIPTION OF THE PREFERRED EMBODIMENTS

In order to make the objectives, technical solutions and advantages of the present disclosure clearer, the present disclosure will be described in further detail below with reference to the accompanying drawings and embodiments. It should be understood that the specific embodiments described herein are only used to explain the present disclosure, but not to limit the present disclosure.

Other embodiments of the present disclosure will readily occur to those skilled in the art upon consideration of the specification and practice of the disclosure disclosed herein. This disclosure is intended to cover any variations, uses, or adaptations of this disclosure that follow the general principles of this disclosure and include common general knowledge or techniques in the technical field not disclosed by this disclosure.

First Embodiment

Figure 1:
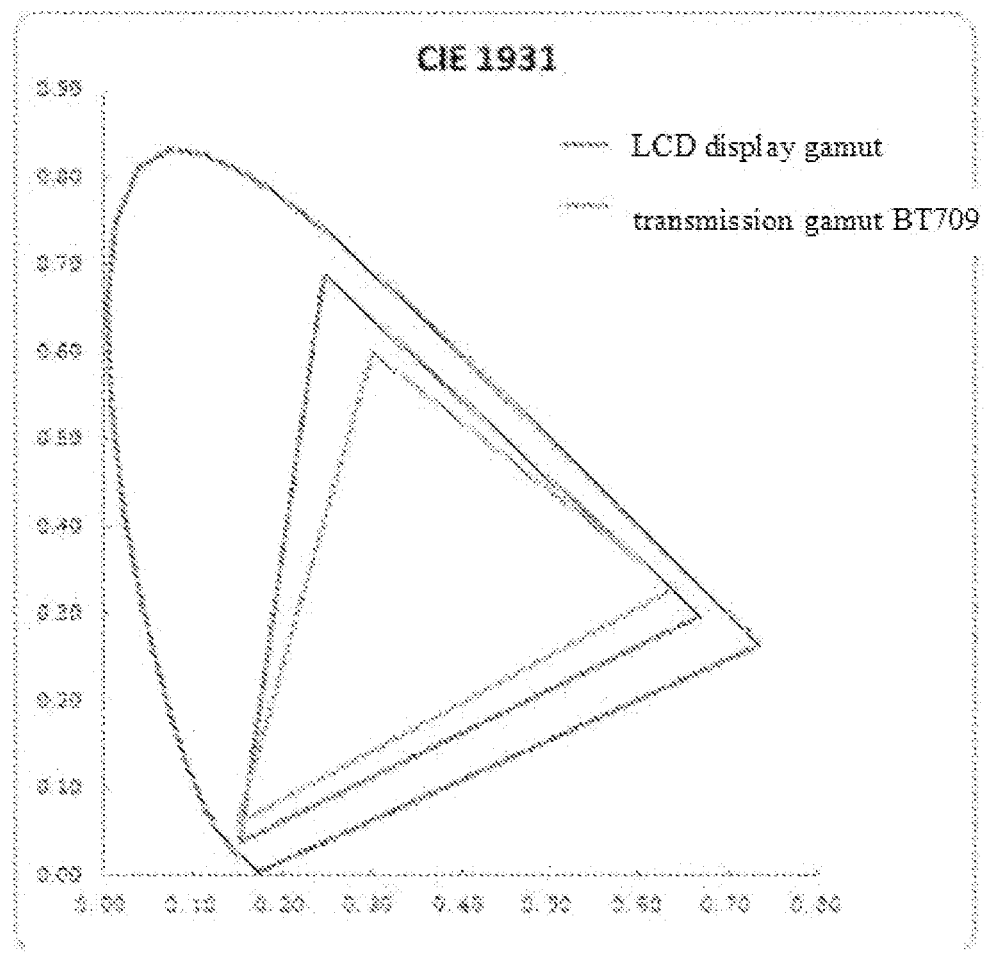
FIG. 1 is a schematic view of a two-dimensional surface of a transmission end gamut and a display gamut in the prior art.
Figure 2:
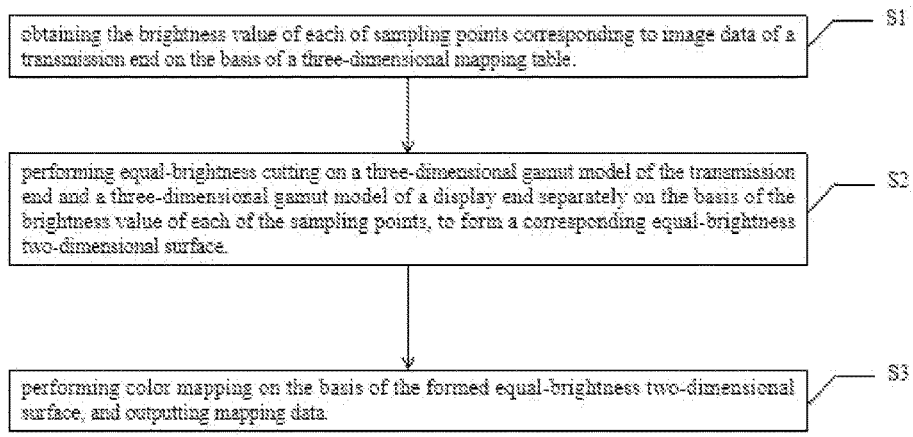
FIG. 2 is a flowchart of steps of a gamut mapping method in an embodiment of the present disclosure.

This embodiment provides a gamut mapping method, as shown in FIG. 2, including:

Step S1: obtaining a brightness values of each of sampling points corresponding to image data of a transmission end on the basis of a three-dimensional mapping table.

An embodiment of this disclosure solves a technical problem of how to map a color space of the image data of the transmission end to a color space of a display end accurately, so as to realize the accurate restoration of color contained in the image data.

Obtain a transmission image data in a transmission color space, take a sample of the transmission image data on the basis of each sampling point of the three-dimensional mapping table generated beforehand, and obtain brightness values of each of the sampling points.

The three-dimensional mapping table is a 3D LUT table (Look-Up-Table, display look-up table), its essence is a RAM. Whenever a signal is input, an address is input to look up the table, and content corresponding to the address is found and output, which plays the role of conversion of a color space for a display. The role of the LUT is to convert each set of RGB input values into output values, convert the RGB values of the input sampling data, and correct nonlinear properties in the sampling data, such as color crosstalk, hue, saturation, brightness, and so on, so that converted sampling data can be more accurately controlled after being converted by the three-dimensional mapping table and displayed and calibrated.

Figure 3:
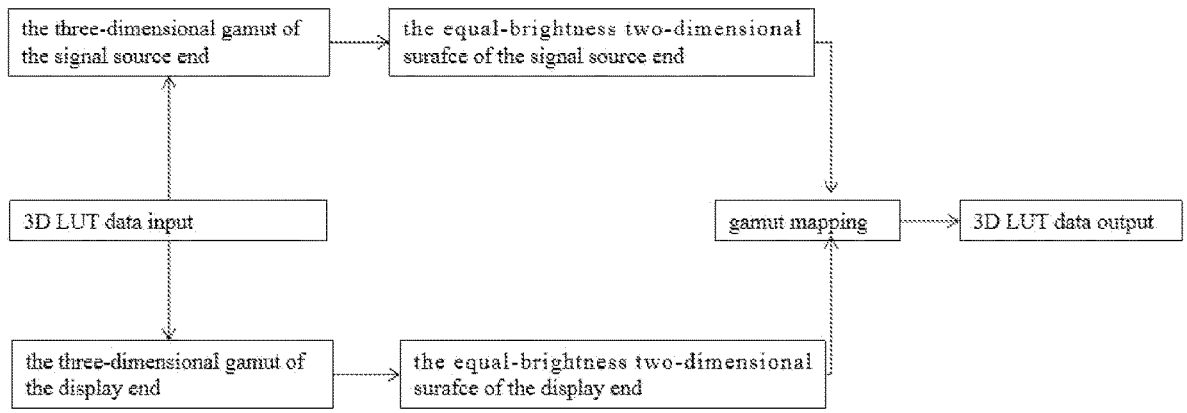
FIG. 3 is a schematic diagram of working principles of the gamut mapping method in the embodiment of the present disclosure.

As shown in FIG. 3, if the three-dimensional mapping table contains all pixel data to be transmitted, an amount of data is relatively large. Therefore, when transmitting image data, data of limited sampling points is generally input. According to a number of sampling points, there are 17×17×17, 24×24×24, and other forms. Therefore, there are multiple sampling points in the three-dimensional mapping table. In a specific gamut mapping step, only gamut coordinates corresponding to multiple limited sampling points are mapped to the display gamut can it realize transmission of the image data.

Step S2: performing equal-brightness cutting on a three-dimensional gamut model of the transmission end and a three-dimensional gamut model of a display end separately on the basis of the brightness values of each sampling point, and forming corresponding equal-brightness two-dimensional surfaces.

The three-dimensional gamut model of the transmission end reflects color to be transmitted by a signal end. The three-dimensional gamut model of the display end reflects the color capability that the display can present.

In order to extract the brightness value of each sampling point in the image data based on the three-dimensional mapping table, before the step of obtaining the image data of the transmission gamut, the gamut mapping method further includes the step of building the three-dimensional gamut model of the transmission end and the three-dimensional gamut model of the display end separately.

Figure 4:
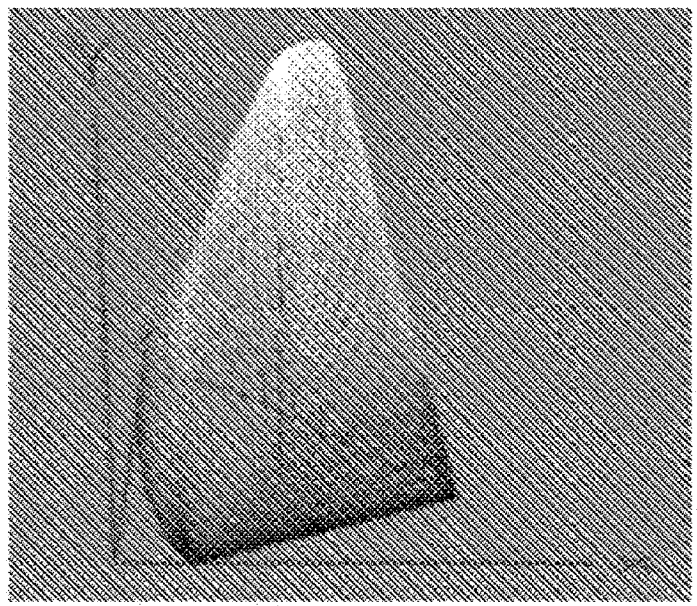
FIG. 4 is a schematic structural view of a three-dimensional gamut model in the embodiment of the present disclosure.

In the color space, the three-dimensional gamut model of the transmission gamut and the three-dimensional gamut model of the display gamut are built separately. As shown in FIG. 4, it is a schematic structural view of a three-dimensional gamut model. The three-dimensional gamut model reflects a three-dimensional structure composed of each of the sampling points in a three-dimensional gamut coordinate. The three-dimensional gamut model reflects coordinate values on a three-gamut-dimension. In order to obtain the equal-brightness two-dimensional surfaces, it is necessary to obtain the brightness value of each of the sampling points. And in order to obtain the brightness value of each of the sampling points, it is necessary to build the three-dimensional gamut model of the transmission gamut and the three-dimensional gamut model of the display gamut.

Figure 5:
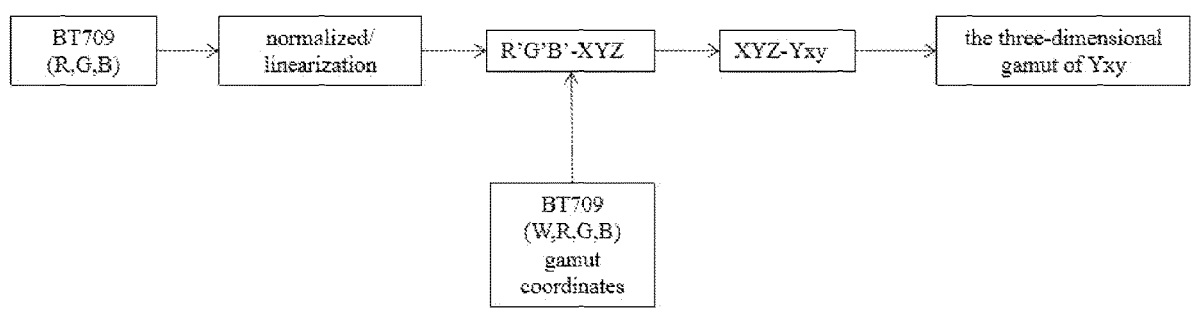
FIG. 5 is a flowchart of building a three-dimensional gamut model of a signal source end in the embodiment of the present disclosure.

Specifically, as shown in FIG. 5, the step of building the three-dimensional gamut model of the transmission end includes the steps of:

Step S211: performing a linearization processing on the obtained image data, and obtaining linear RGB coordinates of each pixel point in the image data after the linearization processing.

Since the received transmitted image data are all non-linear, it is necessary to perform the linearization processing on the received transmitted image data first, so that the image data after the linearization processing is within a preset range, which is convenient for transmitting and controlling. Taking image data of BT709 signal source as an example, its value range is 0–($2^n$–1) (n is a number of data bits), so after linearizing or normalizing it, the value of its image data is within 0-1, thus obtaining linear RGB coordinates.

Step S212: determining three-dimensional gamut coordinates converted from the linear RGB coordinates to an XYZ color space using a preset matrix parameter and the linear RGB coordinates of each pixel point.

The preset matrix parameter is a preset constant, and the preset constant is related to a set of gamut coordinates of the signal source of the transmission end. For example: gamut coordinates of R, G, B vertices (x, y) of the BT709 signal source are (0.640, 0.330), (0.300, 0.600), (0.150, 0.060), respectively. A white point (x, y) coordinate is (0.3127, 0.3290). The preset matrix parameter is obtained according to the coordinate values of the vertex and the white point of the given signal source. For the specific steps of obtaining the matrix parameters, please refer to the relevant content in chapter 1.4.2 of the Fourth Edition of "The Principles of Television" by Yu Sile et al.

The linear RGB coordinates are converted into the three-dimensional gamut coordinates in an XYZ color space through coordinate conversion according to the preset matrix parameters and the linear RGB coordinates of each pixel.

Step S213: determining three-dimensional gamut coordinates converted from the linear RGB coordinates to a Yxy color space according to the three-dimensional gamut coordinates converted to the XYZ color space.

Convert the linear RGB coordinates obtained in the above steps to the three-dimensional gamut coordinates of the XYZ color space, and then convert them to the Yxy color space by coordinate conversion again to obtain the three-dimensional gamut coordinates of the linear RGB coordinates in the Yxy color space.

Step S214: building the three-dimensional gamut model of the transmission gamut according to the three-dimensional gamut coordinates converted to the Yxy color space.

According to the three-dimensional gamut coordinates converted from the linear RGB coordinates to the Yxy color space, a three-dimensional gamut model of the transmission gamut is built, that is, the three-dimensional gamut coordinates corresponding to the linear RGB values in the Yxy color space are sequentially filled into the Yxy color space to obtain a three-dimensional gamut model of the transmission gamut, that is, a three-dimensional model composed of its gamut coordinates.

Figure 6:
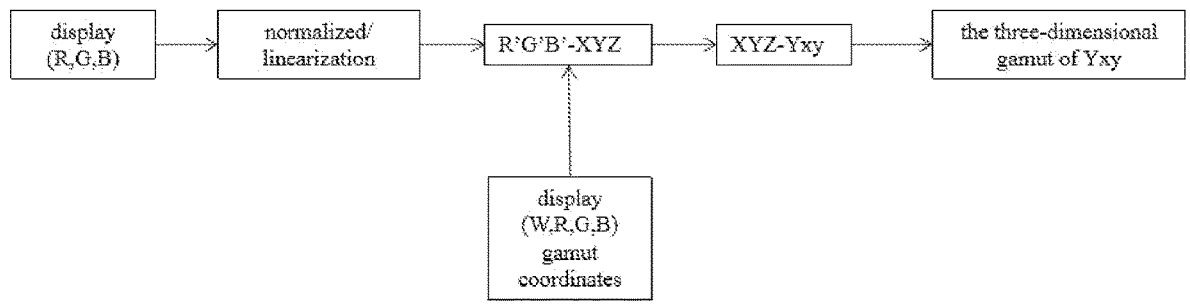
FIG. 6 is a flowchart of building a three-dimensional gamut model of a display end in the embodiment of the present disclosure.

As shown in FIG. 6, the step of building the three-dimensional gamut model of the display end includes the steps of:

Step S221: obtaining display image data corresponding to display setting parameters on a display, normalizing the display image data, and obtaining linear RGB coordinates of each pixel point in the display image data after the linearization processing.

Since the display image data corresponding to the display setting parameters obtained on the display is all non-linear, it is necessary to linearize it first, so that the linearized image data is within a preset range, which is convenient for its transmission control. After linearizing or normalizing it, set the value range of its image data within 0-1 to obtain linear RGB coordinates.

Step S222: determining three-dimensional gamut coordinates converted from the linear RGB coordinates to an XYZ color space according to pre-stored display parameter matrices and linear RGB coordinates of each display pixel.

This step is different from the above step S212, the preset display parameter matrix is determined based on the RGB vertex gamut coordinates and white point coordinates of the display at the display end, and the preset display parameter matrix is obtained by calculating the RGB vertex gamut coordinates and the white point coordinates of the display. Then, based on the obtained preset display parameter matrix and the linear RGB coordinates, the three-dimensional gamut coordinates converted to the XYZ color space are calculated.

Step S223: determining three-dimensional gamut coordinates converted from the linear RGB coordinates of each display pixel to a Yxy color space according to the three-dimensional gamut coordinates converted to the XYZ color space.

Step S224: building a three-dimensional gamut model of the display end according to the three-dimensional gamut coordinates converted to the Yxy color space.

The brightness values are obtained based on the three-dimensional gamut model of the transmission end and the three-dimensional gamut model of the display end built in the above steps, and cutting on equal-brightness regions of the three-dimensional gamut model according to the obtained brightness values is performed. Since the coordinate values of each sampling point in the three-dimensional gamut model are corresponding to the brightness value, tone, and hue, respectively, sampling points with equal brightness value are in a two-dimensional gamut surface, so based on a same brightness value, the equal-brightness regions of the three-dimensional gamut model can be found.

Specifically, the step of performing cutting on equal-brightness regions of the three-dimensional gamut model of the transmission end and the three-dimensional gamut model of the display end based on the brightness value includes the steps of:

calculating transmission three-dimensional gamut coordinates of each sampling point in the three-dimensional gamut model of the transmission end on the basis of pixel values of each of the sampling points;

performing equal-brightness cutting on the three-dimensional gamut model of the transmission end and the three-dimensional gamut model of the display end separately according to brightness values contained in the transmission three-dimensional gamut coordinates, and obtaining a series of equal-brightness two-dimensional surfaces.

Specifically, the step of calculating the transmission three-dimensional gamut coordinates of each sampling point in the three-dimensional gamut model of the transmission end on the basis of the pixel points values of each sampling point includes the steps of:

Step S231: performing the linearization processing on each of the sampling points and obtaining linear RGB coordinates of each sampling point after the linearization processing.

Since it is only necessary to perform cutting on the equal-brightness regions of the three-dimensional gamut model according to the brightness values corresponding to the sampling points, only the linear RGB coordinates corresponding to each sampling point in the three-dimensional mapping table need to be extracted in this step.

Step S232: determining three-dimensional gamut coordinates converted from the linear RGB coordinates of each sampling point to an XYZ color model according to the preset matrix parameter and the linear RGB coordinates corresponding to each sampling point;

Step S233: determining transmission three-dimensional gamut coordinates converted from the linear RGB coordinates of each sampling point to a Yxy color model according to the three-dimensional gamut coordinate converted to the XYZ color model.

From the above steps S232 to S233, the linear RGB coordinates are gradually converted to the XYZ color space, and then are converted from the XYZ color space to the Yxy color space. The obtained three-dimensional gamut coordinates corresponding to each sampling point on the Yxy color space are converted.

Specifically, the step of performing cutting on the equal-brightness regions of the three-dimensional gamut model of the transmission gamut according to the brightness values in the three-dimensional gamut coordinates converted from the linear RGB coordinates of each sampling point to the Yxy color space includes the steps of:

performing equal-brightness cutting on the three-dimensional gamut model of the transmission end and the three-dimensional gamut model of the display end separately according to the brightness values contained in the transmission three-dimensional gamut coordinates, and obtaining a series of equal-brightness two-dimensional surfaces.

Step S3: performing color mapping on the basis of the equal-brightness two-dimensional surface and outputting the mapping data.

In the step S3, build a mapping relationship between RGB coordinates of each sampling point on the equal-brightness two-dimensional surface of the transmission end and RGB coordinates of each sampling point on the equal-brightness two-dimensional surface of the display end on the basis of equal-brightness values. Map values of the RGB coordinates of each sampling point of the transmission end to the equal-brightness two-dimensional surface of the display end according to the mapping relationship. The mapping data is image data of the RGB coordinates values of each sampling point of the transmission end mapping to the equal-brightness two-dimensional surface of the display end.

This step S3 specifically includes the steps of:

Step S31: obtaining a two-dimensional gamut surface of a transmission gamut of equal-brightness and a two-dimensional surface of a display gamut of equal-brightness.

Step S32: according to pre-stored RGB coordinates of the white points corresponding to the transmission end, RGB coordinates of white points corresponding to the display end, linear RGB coordinates of each sample points in the equal-brightness two-dimensional surface, coordinates of intersection of a connecting line composed of the white points and each sampling point with the equal-brightness two-dimensional surface of the transmission end, and coordinates of intersection of the connecting line with the equal-brightness two-dimensional surface of the display end, calculating the linear RGB coordinates of each sampling point on the equal-brightness two-dimensional surface of the transmission end mapping to the linear RGB coordinates on the equal-brightness two-dimensional surface of the display end.

Figure 7:
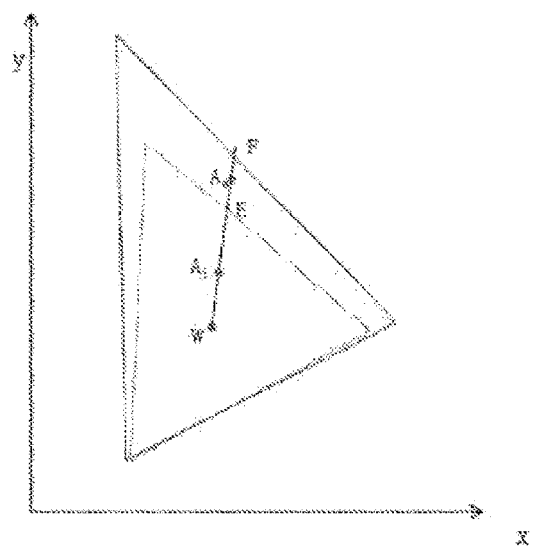
FIG. 7 is a flowchart of brightness calculation of an equal-brightness two-dimensional surface in the embodiment of the present disclosure.

With reference to FIG. 7, the signal source BT709 is used as an example. The horizontal axis is a tone coordinate x, and the vertical axis is a tone coordinate y. A triangle with a slightly smaller area in the FIG. is a two-dimensional transmission gamut surface, and the corresponding brightness value is brightness Y of one pixel in the 17×17×17 data input by the 3D LUT, which is the cut-out equal-brightness two-dimensional gamut surface in the source BT709 three-dimensional gamut. A triangle with a slightly larger area is the cut-out equal-brightness two-dimensional gamut surface in the three-dimensional gamut of the display end with same brightness Y.

$W(x_w, y_w)$ is the white point of the BT709 and the display. $A_i(x_{Ai}, y_{Ai})$ is one known pixel of one of the 17×17×17 data. Connect W and $A_i$, and extend them to intersect two triangles at $E(x_E, y_E)$ and $F(x_F, y_F)$ respectively. The points on the WF are of a same tone because of a same x and y ratio. $A_O$ is the target point.

The coordinate $(x_{AO}, y_{AO})$ of the $A_O$ point is calculated as follows:

$$WA_i/WE = WA_O/WF$$

$$X_{AO} = (x_{Ai} - x_w) * (x_F - x_w)/(x_E - x_w)$$

$$y_{AO} = (y_{Ai} - y_w) * (y_F - y_w)/(y_E - y_w)$$

Here, $W(x_w, y_w)$, $A_i(x_{Ai}, y_{Ai})$ are known. $E(x_E, y_E)$, $F(x_F, y_F)$ points can be obtained from the three-dimensional gamut, therefore, $x_{AO}, y_{AO}$ can be obtained.

After the calculation step shown in FIG. 6 and the calculation in FIG. 7, for a given 3D LUT input value RGB, there will be a corresponding Yxy value corresponding to it.

Step S33: combining the linear RGB coordinates of each sampling point on the equal-brightness two-dimensional surface of the display end with the brightness values, converting the combined linear RGB coordinates and the brightness values into the mapping data, and output and displaying the mapping data.

Since the linear RGB coordinates of each sampling point on the equal-brightness two-dimensional surface of the transmission end in the above step S3 are mapped to the equal-brightness two-dimensional surface of the display end, which do not contain the brightness values, it is necessary to add brightness values corresponding to the two-dimensional coordinate in this step. In addition, since the three-dimensional gamut coordinates of the added brightness values are the gamut coordinates in the Yxy color space, in order to display normally, it needs to be converted into the display color space where the display is located, so as to obtain the outputting data of the three-dimensional mapping table.

Figure 8:
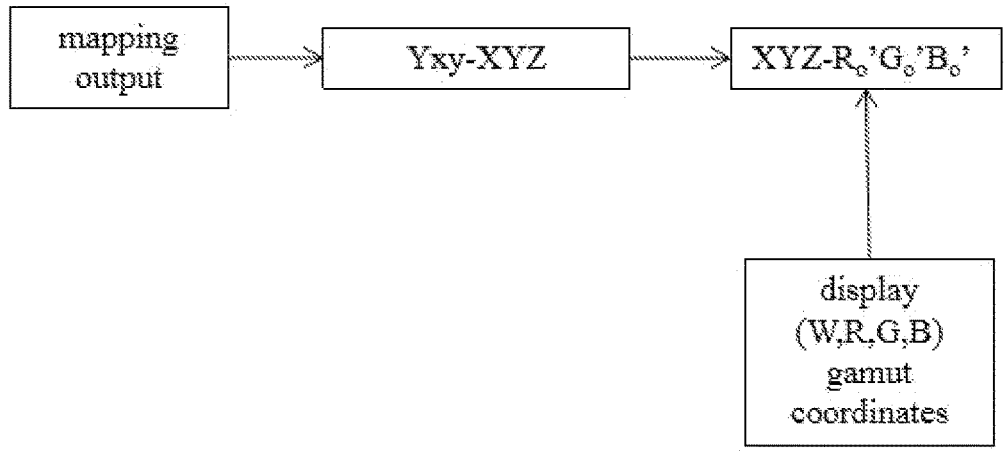
FIG. 8 is a flowchart of calculation of three-dimensional LUT output image data in the embodiment of the present disclosure.

With reference to FIG. 8, the step of combining the linear RGB coordinates of each sampling point on the equal-brightness two-dimensional surface of the display end with the brightness values, and then converting the combined linear RGB coordinates and the brightness values into the mapping data, and outputting and displaying the mapping data includes the steps of:

obtaining a set of values of a three-dimensional RGB value of a target gamut according to the combination of two-dimensional pixel values of the target gamut and its brightness values;

converting the values of the three-dimensional RGB of the target gamut to three-dimensional gamut coordinates of an XYZ color model from three-dimensional gamut coordinates of a Yxy color model according to a conversion formula between values of an RGB of the XYZ color model and values of an RGB of the Yxy color model;

calculating the outputting image data according to the three-dimensional gamut coordinate of the target gamut converted to the XYZ color model and a display parameter matrix of a preset display.

Since the outputting data of the three-dimensional mapping table only contains limited sampling point data, the step of obtaining the display image data according to the outputting data of the three-dimensional mapping table includes the steps of:

filling the outputting data of the three-dimensional mapping table using a linear interpolation method to obtain display image data.

The outputting data of the three-dimensional mapping table is expanded using the linear interpolation method, so that the pixel values of the display image data meets the high-definition display conditions or the requirements of other higher or lower display pixels, so as to obtain the display image data.

The above method of the present disclosure will be described in more detail below with a specific application example of this embodiment. In the following application example, the color space Yxy takes BT709 as the signal source and 17×17×17 3D LUT as an example. The signal source can be other types, such as BT601, and the three-dimensional mapping table can also be in the form of 24×24×24.

FIG. 5 is a flowchart of building a three-dimensional gamut model of a signal source end, and the processing flow is as follows.

(1) The BT709 image data input is nonlinear R, G, B image data. The value range is $0-(2^n-1)$ (n is the number of data bits).

(2) The normalization/linearization module normalizes the maximum value of nonlinear R, G, B image data. The value range of the normalized image data is 0-1.

$$R_1 = R/(2^n - 1)$$

$$G1 = G/(2n-1)$$

$$B1 = B/(2n-1)$$

The linearization module is to linearize the nonlinear data and to obtain linear R', G', B' data.

(3) Conversion of linear R'G'B' to XYZ.

The gamut coordinates of the R, G, and B vertices (x, y) of the BT709 signal source are (0.640, 0.330), (0.300, 0.600), and (0.150, 0.060), respectively. The white point (x, y) coordinate is (0.3127, 0.3290). Then the conversion of R'G'B' to XYZ is given by the following formula.

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R' \\ G' \\ B' \end{pmatrix}$$

(4) The conversion of XYZ to Yxy is converted by the following equation:

$$Y = Y$$

$$x = X/(X+Y+Z)$$

$$y = Y/(X+Y+Z)$$

(5) building a three-dimensional gamut based on Yxy data.

Assuming that the BT709 image input (R, G, B) data is 8 bits, there are 256×256×256 groups of (R, G, B) data, each group of data, after conversion, corresponds to a group of Yxy data, so there are 256×256×256 sets of Yxy data forming the three-dimensional gamut of BT709. Due to the large amount of computation, these calculations are computed beforehand.

FIG. 6 is a flowchart of building the three-dimensional gamut model of the display end.

Different from the three-dimensional gamut building process of the transmission end, when converting R'G'B' to XYZ, the matrix used is determined by the R, G, B vertex gamut coordinates and white point coordinates of the display, which is:

$$\begin{pmatrix} X \\ Y \\ Z \end{pmatrix} = \begin{pmatrix} b10 & b11 & b12 \\ b20 & b21 & b22 \\ b30 & b31 & b32 \end{pmatrix} \begin{pmatrix} R' \\ G' \\ B' \end{pmatrix}$$

Wherein matrix coefficients b10, b11, ..., b32 are determined by the physical parameters of the display, that is, the gamut coordinates of the R, G, and B vertices and the white point coordinates.

As shown in the above flowcharts in FIG. 5 and FIG. 6, according to the R, G, B vertex gamut coordinates and white point coordinates of the display and BT709, the three-dimensional gamut model based on Yxy is built In FIG. 5, the BT709 input data of 256×256×256 groups of R, G, and B are normalized/linearized to obtain 256×256×256 groups of linear R', G', B' data. 17×17×17 groups R', G', and B' are used as 3D LUT sampling data, that is, the input data $R_i'$, $G_i'$, and $B_i'$ of the 3D LUT.

The input data $R_i'$, $G_i'$, and $B_i'$ of the 3D LUT are converted into XYZ according to the matrix coefficients of formula 1, and then XYZ is converted into Yxy and obtain Y values corresponding to $R_i'$, $G_i'$, and $B_i'$. Here Y is a brightness value of the next equal-brightness two-dimensional surface.

Perform equal-brightness cutting on the three-dimensional gamut according to the brightness values of Y, and 17×17×17 equal-brightness two-dimensional surfaces are obtained.

The gamut mapping based on equal-brightness and equal-tone in FIG. 7 is performed in 17×17×17×2 equal-brightness two-dimensional surfaces of the transmission end and the display end.

FIG. 8 is a flowchart of calculation of three-dimensional LUT output image data.

After the flowchart in FIG. 6 and the calculation in FIG. 7, for a given 3D LUT input value R'G'B', there will be a corresponding Yxy value corresponding to it. The 3D LUT output calculation process shown in FIG. 8 is a process of converting the corresponding Yxy value into a $R_o'G_o'B_o'$ value, that is, a calculation process of the outputting data of the 3D LUT.

Firstly, convert the mapped and output Yxy data to XYZ:

$X=xY/y$ $Y=Y$ $Z=(1-x-y)Y/y$

Then, convert XYZ to Ro'Go'Bo' and output.

$$\begin{pmatrix} Ro' \\ Go' \\ Bo' \end{pmatrix} = \begin{pmatrix} c10 & c11 & c12 \\ c20 & c21 & c22 \\ c30 & c31 & c32 \end{pmatrix} \begin{pmatrix} X \\ Y \\ Z \end{pmatrix}$$

The matrix coefficients c10, c11, ..., c32 are determined by the physical parameters of the display, that is, the R, G, B vertex gamut coordinates and white point coordinates.

Ro'Go'Bo' is the outputting data of the 3D LUT.

Figure 9:
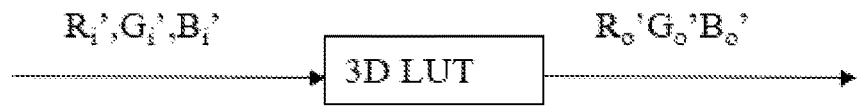
FIG. 9 is a schematic view of generation of equivalent three-dimensional LUT output image data in the embodiment of the present disclosure.

After the processes and calculations in FIGS. 6, 7, and 8, each group of $R_i'$, $G_i'$, $B_i'$ values of 17×17×17 in the 3D LUT has a set of Ro'Go'Bo' value corresponding to it according to the gamut mapping of equal-brightness and equal-tone. That is, the 3D LUT-based equal-brightness, equal-tone gamut mapping is completed. FIG. 9 is an equivalent diagram of a 3D LUT.

In practical applications, due to the large amount of calculation, the above-mentioned processes in FIGS. 5-9 are performed offline. After the above process, 17×17×17 groups of values are finally calculated, and the 17×17×17 groups of values are written into the 3D LUT.

Second Embodiment

Figure 10:
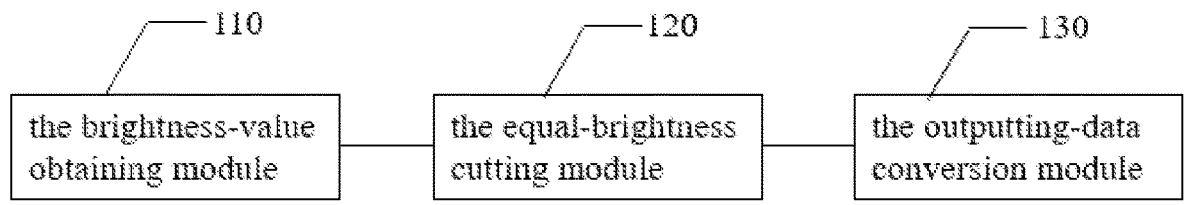
FIG. 10 is a schematic structural block view of a gamut mapping system described in the embodiment of the present disclosure.

This embodiment also provides a gamut mapping system, as shown in FIG. 10, including:

a brightness-value obtaining module 110, being used to obtain a brightness value of each of sampling points corresponding to image data of a transmission end on the basis of a three-dimensional mapping table;

an equal-brightness cutting module 120, being used to perform equal-brightness cutting on a three-dimensional gamut model of the transmission end and a three-dimensional gamut model of a display end separately on the basis of the brightness value of each of the sampling points, and form a corresponding equal-brightness two-dimensional surface; and an outputting-data conversion module 130, being used to perform color mapping on the basis of the equal-brightness two-dimensional surface, and output mapping data.

The system provided by the embodiment of the present disclosure calculates the brightness value of each of the sampling points in the three-dimensional mapping table according to the input image data; performs cutting on the equal-brightness regions of the pre-built three-dimensional gamut model of the transmission end and the three-dimensional gamut model of the display end on the basis of the brightness value of each of the sampling points, so as to obtain the equal-brightness two-dimensional surface of the transmission end and the equal-brightness two-dimensional surface of the display end; performs equal-brightness and equal-tone color mapping on the two-dimensional surface of the transmission end and the two-dimensional surface of the display end, and calculate the two-dimensional pixel values of the target gamut; combines the two-dimensional pixel values of the target gamut with the brightness values, and converts them into outputting image data. It can be seen that the method of the present disclosure keeps the brightness and tone unchanged when performing gamut mapping, so as to achieve accurate matching of the three-dimensional gamut mapping from the transmission gamut to the display gamut. Problems such as image distortion or display errors caused by the mismatch between the transmission gamut and the display gamut are avoided.

The above descriptions are only preferred embodiments of the present disclosure, and are not intended to limit the present disclosure. Any modifications, equivalent replacements, improvements, etc. made within the spirit and principles of the present disclosure shall be included in the protection range of the present disclosure.

What is claimed is:

1. A gamut mapping method, wherein comprising:
    building a three-dimensional gamut model of a transmission end and a three-dimensional gamut model of a display end separately;

obtaining a brightness value of each of sampling points corresponding to image data of the transmission end on a basis of a three-dimensional mapping table;

performing equal-brightness cutting on the three-dimensional gamut model of the transmission end and the three-dimensional gamut model of the display end separately on a basis of the brightness values of the sampling points, and forming corresponding equal-brightness two-dimensional surfaces; and obtaining a two-dimensional gamut surface of a transmission gamut of equal-brightness and a two-dimensional surface of a display gamut of equal-brightness;

building a mapping relationship between the RGB coordinates of each sampling point on an equal-brightness two-dimensional surface of the transmission end and the RGB coordinates of each sampling point on an equal-brightness two-dimensional surface of the display end according to pre-stored RGB coordinates of white points corresponding to the transmission end, RGB coordinates of white points corresponding to the display end, linear RGB coordinates of each sampling point on the equal-brightness two-dimensional surface, coordinates of intersection of a connecting line composed of the white point and each sampling point with the equal-brightness two-dimensional surface of the transmission end, and coordinates of intersection of the connecting line with the equal-brightness two-dimensional surface of the display end; and mapping the RGB coordinates of each sampling point of the transmission end to the equal-brightness two-dimensional surface of the display end according to the mapping relationship.

2. The gamut mapping method as claimed in claim 1, wherein the step of building the three-dimensional gamut model of the transmission end comprises:

performing a linearization processing on the image data obtained, and obtaining linear RGB coordinates of each of pixel points in the image data after the linearization processing;

determining a plurality of three-dimensional gamut coordinates converted from the linear RGB coordinates to an XYZ color model using preset matrix parameters and the linear RGB coordinates of each of the pixel points;

determining a plurality of three-dimensional gamut coordinates converted from the linear RGB coordinates to a Yxy color model according to the three-dimensional gamut coordinates converted to the XYZ color model; and building the three-dimensional gamut model of the transmission end according to the three-dimensional gamut coordinate converted to the Yxy color model.

3. The gamut mapping method as claimed in claim 2, wherein the step of performing the linearization processing on the obtained image data comprises:

converting a value range of the obtained image data from $0-(2^n-1)$ to 0-1.

4. The gamut mapping method as claimed in claim 1, wherein the step of building the three-dimensional gamut model of the display end comprises:

obtaining display image data corresponding to display setting parameters on a display, normalizing the display image data, and obtaining linear RGB coordinates of each of pixel points in the display image data after a linearization processing;

determining a plurality of three-dimensional gamut coordinates converted from the linear RGB coordinates of each of the pixel points in the display image data to an XYZ color model according to a plurality of pre-stored display parameter matrices and the linear RGB coordinates of each of the pixel points in the display image data;

determining a plurality of three-dimensional gamut coordinates converted from the linear RGB coordinates of each of the pixel points in the display image data to a Yxy color model according to the three-dimensional gamut coordinates converted to the XYZ color model; and building the three-dimensional gamut model of a display gamut of the display end according to the three-dimensional gamut coordinates converted to the Yxy color model.

5. The gamut mapping method as claimed in claim 1, wherein the step of performing equal-brightness cutting on the three-dimensional gamut model of the transmission end and the three-dimensional gamut model of the display end separately on the basis of the brightness values of the sampling points, and forming the corresponding equal-brightness two-dimensional surfaces comprises:

calculating transmission three-dimensional gamut coordinates of each sampling point in the three-dimensional gamut model of the transmission end on a basis of pixel point values of each sampling point; and performing equal-brightness cutting on the three-dimensional gamut model of the transmission end and the three-dimensional gamut model of the display end separately according to brightness values contained in the transmission three-dimensional gamut coordinates, and obtaining a series of equal-brightness two-dimensional surfaces.

6. The gamut mapping method as claimed in claim 5, wherein the step of calculating transmission three-dimensional gamut coordinates of each sampling point in the three-dimensional gamut model of the transmission end on the basis of pixel point values of each sampling point comprises:

performing a linearization processing on each sampling point, and obtaining linear RGB coordinates of each sampling point after the linearization processing;

determining three-dimensional gamut coordinates converted from the linear RGB coordinates of each sampling point to an XYZ color model according to preset matrix parameters and the linear RGB coordinates of each sampling point; and determining transmission three-dimensional gamut coordinates converted from the linear RGB coordinates of each sampling point to a Yxy color model according to the three-dimensional gamut coordinate converted to the XYZ color model.

7. The gamut mapping method as claimed in claim 1, wherein a relational expression of the mapping relationship between the RGB coordinates of each sampling point on the equal-brightness two-dimensional surface of the transmission end and the RGB coordinates of each sampling point on the equal-brightness two-dimensional surface of the display end is:

$$WA_i/WE = WA_O/WF$$

$$x_{AO} = (x_{Ai} - x_w) * (x_F - x_w)/(x_E - x_w)$$

$$y_{AO} = (y_{Ai} - y_w) * (y_F - y_w)/(y_E - y_w)$$

wherein $W(x_w, y_w)$ is the pre-stored RGB coordinate of the white points corresponding to the transmission end, $A_i(x_{Ai},y_{Ai})$ is a linear RGB coordinate of given sampling point, $E(x_E,y_E)$ is a coordinate of intersection of a connecting line composed of $W(x_w,y_w)$ and $A_i(x_{Ai},y_{Ai})$ with the equal-brightness two-dimensional surface of the transmission end, $F(x_F,y_F)$ is a coordinate of intersection of the connecting line with the equal-brightness two-dimensional surface of the display end, $WA_i$ is a straight line composed of two points $W(x_w,y_w)$ and $A_i(x_{Ai},y_{Ai})$, WE is a straight line composed of two points $W(x_w,y_w)$ and $E(x_E,y_E)$, $WA_O$ is a straight line composed of two points $W(x_w,y_w)$ and $A_O(x_{AO},y_{AO})$, and WF is a straight line composed of two points $W(x_w,y_w)$ and $F(x_F,y_F)$.

8. The gamut mapping method as claimed in claim 7, wherein the step of mapping the RGB coordinates of each sampling point of the transmission end to the equal-brightness two-dimensional surface of the display end according to the mapping relationship comprises:

calculating linear RGB coordinates of each sampling point on the equal-brightness two-dimensional surface of the transmission end mapping to linear RGB coordinates on the equal-brightness two-dimensional surface of the display end according to the pre-stored RGB coordinates of the white points corresponding to the transmission end, the RGB coordinates of the white points corresponding to the display end, the linear RGB coordinates of each sampling point on the equal-brightness two-dimensional surface, the coordinates of intersection of the connecting line composed of the white point and each sampling point with the equal-brightness two-dimensional surface of the transmission end, and the coordinates of intersection of the connecting line with the equal-brightness two-dimensional surface of the display end, and the relational expression of the mapping relationship; and combining the linear RGB coordinates of each sampling point on the equal-brightness two-dimensional surface of the display end with the brightness values, converting the combined linear RGB coordinates and the brightness values into the mapping data, and outputting and displaying the mapping data.

9. The gamut mapping method as claimed in claim 8, wherein the step of combining the linear RGB coordinates of each sampling point on the equal-brightness two-dimensional surface of the display end with the brightness values, converting the combined linear RGB coordinates and the brightness values into the mapping data, and outputting and displaying the mapping data comprises:

obtaining values of a three-dimensional RGB of a target gamut according to a combination of values of a two-dimensional pixel of the target gamut and its brightness values;

converting the values of the three-dimensional RGB of the target gamut to three-dimensional gamut coordinates of an XYZ color model from three-dimensional gamut coordinates of a Yxy color model according to a conversion formula between RGB values of the XYZ color model and RGB values of the Yxy color model; and calculating outputting image data according to the three-dimensional gamut coordinates of the target gamut converted to the XYZ color model and preset display parameter matrices of a display.

10. The gamut mapping method as claimed in claim 8, wherein the step of combining the linear RGB coordinates of each sampling point on the equal-brightness two-dimensional surface of the display end with the brightness values, converting the combined linear RGB coordinates and the brightness values into the mapping data, and outputting and displaying the mapping data comprises:

filling the mapping data with a linear interpolation, and outputting and displaying the filled mapping data.

11. The gamut mapping method as claimed in claim 1, wherein before the step of obtaining the brightness values of each sampling point corresponding to the image data of the transmission end on the basis of the three-dimensional mapping table, the gamut mapping method further comprises steps of:

calculating pre-matrix parameters according to two-dimensional coordinates of an RGB vertex gamut of a signal source end and two-dimensional coordinates of white points of the signal source end; and calculating preset display parameter matrices according to two-dimensional coordinates of an RGB vertex gamut of the display end and two-dimensional coordinates of white points of the display end.

* * * * *